United States Patent
Grohbauer et al.

(10) Patent No.: US 7,686,899 B2
(45) Date of Patent: Mar. 30, 2010

(54) PROCESS FOR PRODUCING A SLIDING BEARING WITH A SLIDING SURFACE, CONSISTING OF A COPPER MULTICOMPONENT ALLOY

(75) Inventors: Adolf Grohbauer, Ulm (DE); Manfred Hage, Senden (DE); Michael Scharf, Dietenheim (DE)

(73) Assignee: Wieland-Werke AG, Ulm (DE)

( * ) Notice: Subject to any disclaimer, the term of this patent is extended or adjusted under 35 U.S.C. 154(b) by 676 days.

(21) Appl. No.: 11/393,534

(22) Filed: Mar. 30, 2006

(65) Prior Publication Data

US 2006/0219328 A1 Oct. 5, 2006

(30) Foreign Application Priority Data

Mar. 30, 2005 (DE) .................. 10 2005 014 302

(51) Int. Cl.
*F16C 33/14* (2006.01)
(52) U.S. Cl. .................. 148/516; 216/66; 216/106; 216/107
(58) Field of Classification Search .................. 148/516; 216/56, 106, 107
See application file for complete search history.

(56) References Cited

FOREIGN PATENT DOCUMENTS

| DE | 548 633 | 3/1932 |
|---|---|---|
| DE | 977 311 | 11/1965 |
| DE | 29 21 471 | 11/1980 |
| DE | 100 47 775 C1 | 4/2002 |
| DE | 101 57 316 A1 | 6/2003 |
| EP | 1 158 062 B1 | 11/2002 |
| WO | WO 97/03298 A1 | 1/1997 |

OTHER PUBLICATIONS

Ullmann's Encyclopedia of Industrial Chemistry, Fifth completely revised edition, vol. A3, pp. 409-411 (5 pages) (1995).
2 Types of Aluminum Bronze, The Hendrix Group, Inc., (2004) (4 pages).
Wrought Copper Alloys; Copper-Aluminum Alloys, Chemical Composition, DIN 17 665, Dec. 1983, Preisgr. 6 (2 pages).
European Search Report dated Mar. 5, 2009, for EP06005445.

*Primary Examiner*—Sikypin Ip
(74) *Attorney, Agent, or Firm*—Flynn, Thiel, Boutell & Tanis, P.C.

(57) ABSTRACT

The invention relates to a process for producing a sliding bearing with a sliding surface, which is made of a copper multicomponent alloy with at least two phase constituents, in which process at least one phase constituent at the sliding surface is dissolved by means of an acid, and at least one further phase constituent is retained in a raised form. The sliding bearing preferably is made of a copper/aluminum multicomponent bronze.

4 Claims, 1 Drawing Sheet

PROCESS FOR PRODUCING A SLIDING BEARING WITH A SLIDING SURFACE, CONSISTING OF A COPPER MULTICOMPONENT ALLOY

FIELD OF THE INVENTION

The invention relates to a process for producing a sliding bearing with a sliding surface, consisting of a copper multicomponent alloy having at least two phase constituents, and to a sliding bearing made from the copper multicomponent alloy.

BACKGROUND OF THE INVENTION

Copper alloys have been proven as materials for bearings for decades. On account of their microstructure and properties, they satisfy the demands imposed on them particularly well. Wrought materials are often used during production and, on account of hot-forming and cold-forming, form a uniform and fine-grained microstructure that is particularly advantageous under sliding stress. The required strength properties can be set by means of microstructural transformation within certain ranges, with the result that the ability to withstand loads and the resistance to wear can be increased.

However, particular demands are imposed on the running surfaces of the sliding partners which are in contact with one another. By using lubricants, a supporting lubricating film is built up by virtue of the adhesion and viscosity of the lubricants, the intention of which is primarily to reduce wear. The surface condition of the running surfaces, in the context of the formation of a lubricating film over the area, has a crucial influence on the service life of a bearing. However, the occurrence of dirt particles has a particularly adverse effect on the service life, whether through abrasion of the bearing surfaces themselves or through introduction between the running surfaces via lubricants.

It is known to produce a targeted surface structuring of the running surface by means of special precision-machining processes. Examples include honing processes, as are used for cylinder liners in internal combustion engines. Machining processes of this type introduce a very fine lubricating pocket system into the liner, with the result that the oil cushion which forms over a lubricant deposit improves the sliding properties and reduces the wear. Furthermore, it is also known to use a laser to structure the surface. In this case, although the shape and position of the individual lubricating pockets can be set in a targeted way, this process is hugely time-consuming and correspondingly expensive as small-scale production.

Moreover, document DE 101 57 316 A1 has disclosed a bearing with a nanoscopically rough bearing surface, and a process for producing a bearing of this type. A bearing surface of this type is intended to improve the bearing properties, in the form of minimizing the formation of particles and reducing the friction. The nanoscopically rough bearing surface is produced by etching, mechanical roughening or by an electrochemical process. In the case of etching, the surface is treated with an optionally heated acid, for example by chromosulfuric acid or sulfuric acid. Suitable materials mentioned for the formation of a nanoscopically rough surface are metal alloys based on iron, titanium or chromium.

Furthermore, document DE 100 47 775 C1 has disclosed copper/aluminum multicomponent bronzes for use as bearing material in engine construction. In the use described, the running surfaces remain untreated, the assumption being that with these high-performance bearing materials tribo-oxidation layers will form after a short running time. These are thin layers which form as a covering layer by means of a chemical reaction as a result of heat and a high contact pressure. In general, these thin layers are desirable, since they reduce the coefficient of friction of the running partners and protect the base material from wear.

SUMMARY OF THE INVENTION

The invention is based on the object of further developing a process for producing a sliding bearing with tribologically favorable sliding surfaces.

With regard to a process for producing a sliding bearing with a sliding surface, consisting of a copper multicomponent alloy having at least two phase constituents, the invention includes the steps in which at least one phase constituent at the sliding surface is dissolved out by means of an acid, and at least one further phase constituent is retained in raised form.

BRIEF DESCRIPTION OF THE FIGURES

Exemplary embodiments of the invention are explained in more detail with reference to a diagrammatic drawing, in which.

DETAILED DESCRIPTION

Figure 1:
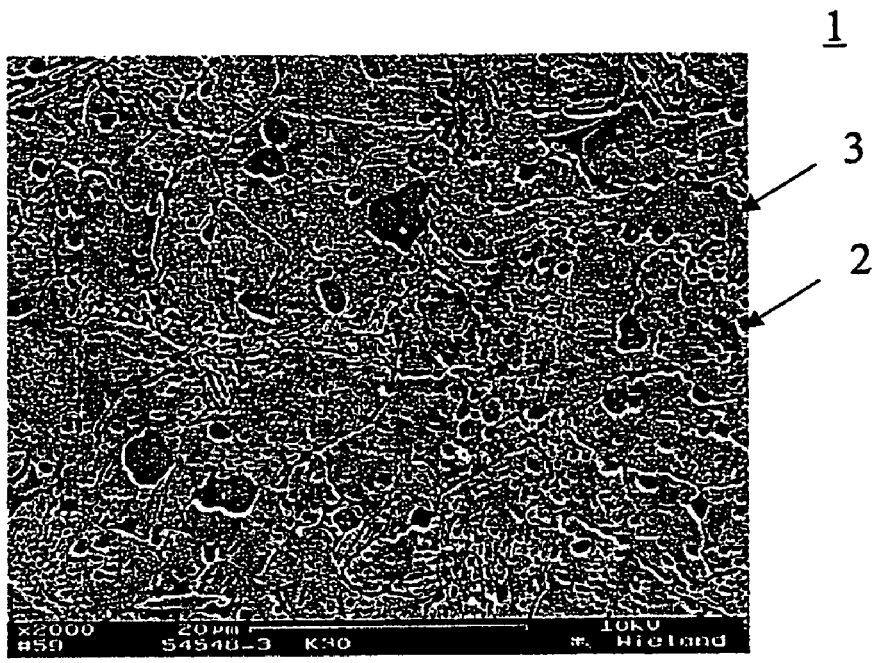
FIG. 1 shows a scanning electron microscope image of a sliding surface of a sliding bearing with partially dissolved phase constituents.

In this context, the invention is based on the consideration of carrying out etching on the surface of bearings in an acid according to the phase constituents in the material. The material is multi-phase, with the individual phase constituents being removed to different extents. This is based on the fact that certain precipitation phases differ considerably from the base material in terms of their electrochemical potential. Therefore, the hard precipitations or the soft base material can be removed in a targeted way, resulting in the formation either of raised hard particles resting on a soft base matrix or in the hard particles being etched out of the soft base matrix, so that they serve only as a support in the underlying microstructure in order to absorb mechanical load. Suitable acids are preferably the mineral acids hydrochloric acid, sulfuric acid and nitric acid, as well as suitable mixtures of these acids.

The etching operation itself takes place quickly, within the range of seconds or a few minutes. The sequential costs incurred are correspondingly low. There is no need for special cleaning of the material that is to be treated. The process according to the invention can also be carried out a number of times, if appropriate using different acids or acid mixtures, in order to remove material to a deeper level. It is also possible for the process to be repeated over the course of the period of use.

An as far as possible optimally matched configuration of running surfaces which come into direct contact with one another in the friction pairing is of crucial importance for the service life of the application. What is located a few millimeters or even tenths of a millimeter below the surface in the material is substantially irrelevant in tribological terms; the determining factor is the contact surface. Particularly at the start of the sliding movement, during the run-in phase of a component, a tribologically favorable surface should be ensured.

The advantages achieved by the invention consist in particular in the fact that as a result of the extremely short process time required for the surface treatment, the process is correspondingly economical. The process results in a surface which is optimum for the respective tribological demands, with favorable run-in conditions, the effect of which is to accelerate the run-in process, to minimize the run-in wear and to make a significant contribution to the service life of the bearing.

In a preferred configuration of the invention, it is possible to use a non-oxidizing acid which dissolves out the more base phase constituents. By employing non-oxidizing mineral acids and mixtures thereof, it is possible to effect a targeted attack on a "more base" phase without attacking the "more noble" base material.

Alternatively, it is possible to use an oxidizing acid which dissolves out the more noble phase constituents. If an acid with an oxidizing action is used, the "more noble" base material is preferentially attacked, whereas the more base phase is passivated by oxidation and thereby becomes insoluble.

Another aspect of the invention relates to a sliding bearing which has been produced by the process described above and consists of a copper/aluminum multicomponent bronze.

Alloys of copper and aluminum, referred to in language of general usage as "aluminum bronzes", in the binary system with an element content of up to 9% by weight aluminum, have a homogenous alpha microstructure. In addition, there are aluminum multicomponent alloys with an aluminum content of up to 10% by weight, which also contain further alloying constituents, such as for example iron, nickel, manganese, zinc and silicon. The microstructure of the multicomponent alloy is then heterogeneous, with further phase constituents being formed. Additions of iron or nickel lead to the formation of an intermetallic phase, which effects a considerable increase in strength. In this case, iron has a grain-refining effect on the crystal microstructure even at a relatively low concentration.

This group of materials also includes the multicomponent alloys produced by means of spray-compacting, which have a low-segregation, fine-grained microstructure. Examples of these materials include the alloys CuAl13Fe4.5CoMn and CuAl15Fe4.5CoMn.

Multicomponent aluminum bronzes of this type, in addition to a very high strength, also have a high wear resistance and a good corrosion resistance. They have a high load-bearing capacity and are thermally stable up to approx. 350° C. On account of their beneficial properties, these materials, when used as liners, satisfy the high demands imposed on the piston bearing arrangement in the automotive industry. This is true in particular for bearing bushes in highly loaded steel pistons and for connecting rods in diesel engines.

The cavities formed in the region where the phase fractions have been dissolved out as can advantageously be designed as lubricant deposits. In this case, the recesses form a reservoir for the lubricants. The deposits also substantially prevent what is known as three-component abrasion, which takes place as a result of particles between the bearing surface and the mating bearing surface. Particles, which are primarily formed during sliding movement of the bearing surfaces and can cause scratches or other damage to the running surface, are received in the cavities and even to a certain extent permanently incorporated. As a result, the wear and friction of the sliding partners are reduced.

In a preferred configuration of the invention, the sliding bearing can consist of a two-phase CuAl10Ni5Fe4 alloy. The sliding bearing may advantageously have the following alloy composition, in % by weight:

| | |
|---|---|
| Cu | remainder |
| Al | 9.0 to 10.5% |
| Ni | 4.0 to 6.0% |
| Fe | 3.5 to 5.0% | and optionally up to 1.0% Zn, 0.1% Pb, 1.5% Mn and 0.1% Si.

In the sliding bearing, the content of the element iron in the alloy may preferably be lower than that of nickel.

Materials of this type are multiphase and may advantageously have a hard kappa phase in addition to the Cu-rich alpha phase. The precipitation phases differ considerably from the base material in terms of their electrochemical potential. With this specific alloy, the "base" elements aluminum, iron and nickel are present to a greater extent in the hard kappa phase. This results in the possibility, depending on the composition of the acid mixture, of attacking either this precipitation phase or the base material in a targeted way. A targeted attack on the kappa phase can be carried out by using a non-oxidizing mineral acid, in which case there is no attack on the "more noble" base material. If an acid with an oxidizing action is used, the "more noble" base material is preferentially attacked, whereas the kappa phase is correspondingly passivated through oxidation. What remains is a surface which is tribologically optimum for the respective application and has optimum run-in conditions, the effect of which is to accelerate the run-in process and to minimize the run-in wear.

For example:

Untreated liners which have been etched in accordance with the process according to the invention were tested on a sliding bearing test bench for a period of 0.5 h under a load of F=10000 N (pivot angle 60°) at 60 cycles/minute. Then, the zone of the liner which had been subjected to load was examined under a scanning electron microscope.

Although untreated liners still have a substantially smooth surface, they did have score marks as wear tracks, which are caused by hard particles and continue over the running surface. A further consequence of this is constantly ongoing wear.

In the case of liners with raised hard phase constituents, these constituents also remain in place over the test period and form the load-bearing running surface at least during the run-in phase. The spaces in between them serve as lubricant deposits and ensure low-wear running even at an early stage. A good running pattern is established.

Corresponding parts are provided with the same reference designations throughout all the figures.

FIG. 1 shows a scanning electron microscope image of a sliding surface 1 of a sliding bearing with partially dissolved hard phase constituents 2. The raised, soft phase constituents 3 were not attacked by the etching process and form the surface which comes into contact with the mating bearing surface of a sliding partner and which in the example illustrated is still of substantially large-area design. The dissolved hard phase constituents 2 have formed a cavity which can accommodate lubricants in operation.

Figure 2:
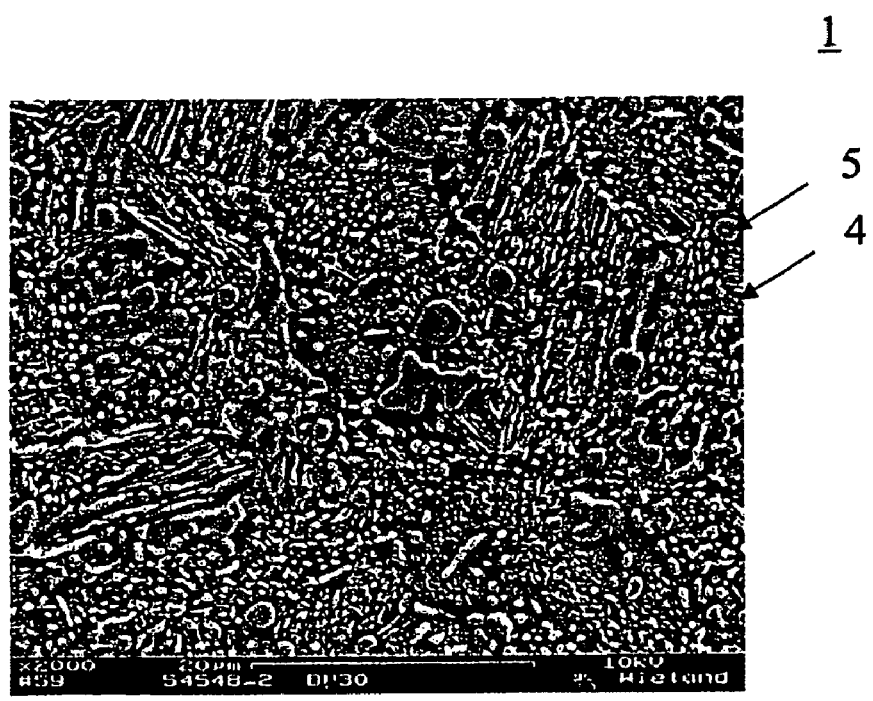
FIG. 2 shows a scanning electron microscope image of a sliding surface of a sliding bearing with phase constituents which have been dissolved over a large area.

FIG. 2 shows a scanning electron microscope image of a sliding surface 1 of a sliding bearing with soft phase constituents 4 which have been dissolved over a large area. The raised, harder phase constituents 5 were again not attacked by the etching process and in this example form a surface which comes into contact with the mating bearing surface. Relatively large cavities, which are connected to one another and in which lubricants can also be transported over the surface, are formed.

What is claimed is:

1. A process for producing a sliding bearing having a sliding surface, comprising the steps of:
   providing a copper-aluminum multicomponent bronze having a copper-rich alpha phase and a kappa phase containing at least one other component;
   contacting the copper-aluminum multicomponent bronze with an oxidizing acid to attack the copper-rich alpha phase, passivate the kappa phase through oxidation thereof and form a surface in which the passivated kappa phase is raised; and
   forming a sliding bearing from the copper-aluminum multicomponent bronze with the surface in which the passivated kappa phase is raised functioning as the sliding surface.

2. The process of claim 1, wherein the kappa phase contains at least one metal selected from the group consisting of aluminum, iron and nickel.

3. The process of claim 1, wherein the copper-aluminum multicomponent bronze further contains at least one metal selected from the group consisting of iron, nickel, manganese, zinc and silicon.

4. The process of claim 1, wherein the copper-aluminum multicomponent bronze is CuAl13Fe4.5CoMn or CuAl15Fe4.5CoMn.

* * * * *